Aug. 16, 1927.

T. S. COLE ET AL 1,639,640

ART OF AND APPARATUS FOR MAKING STORAGE BATTERY PLATES

Filed Aug. 23, 1923

INVENTORS
Theodore S. Cole
Seth Johnson
BY
Robert S. Blair, ATTORNEY

Aug. 16, 1927.
T. S. COLE ET AL
1,639,640
ART OF AND APPARATUS FOR MAKING STORAGE BATTERY PLATES
Filed Aug. 23, 1923
8 Sheets-Sheet 2
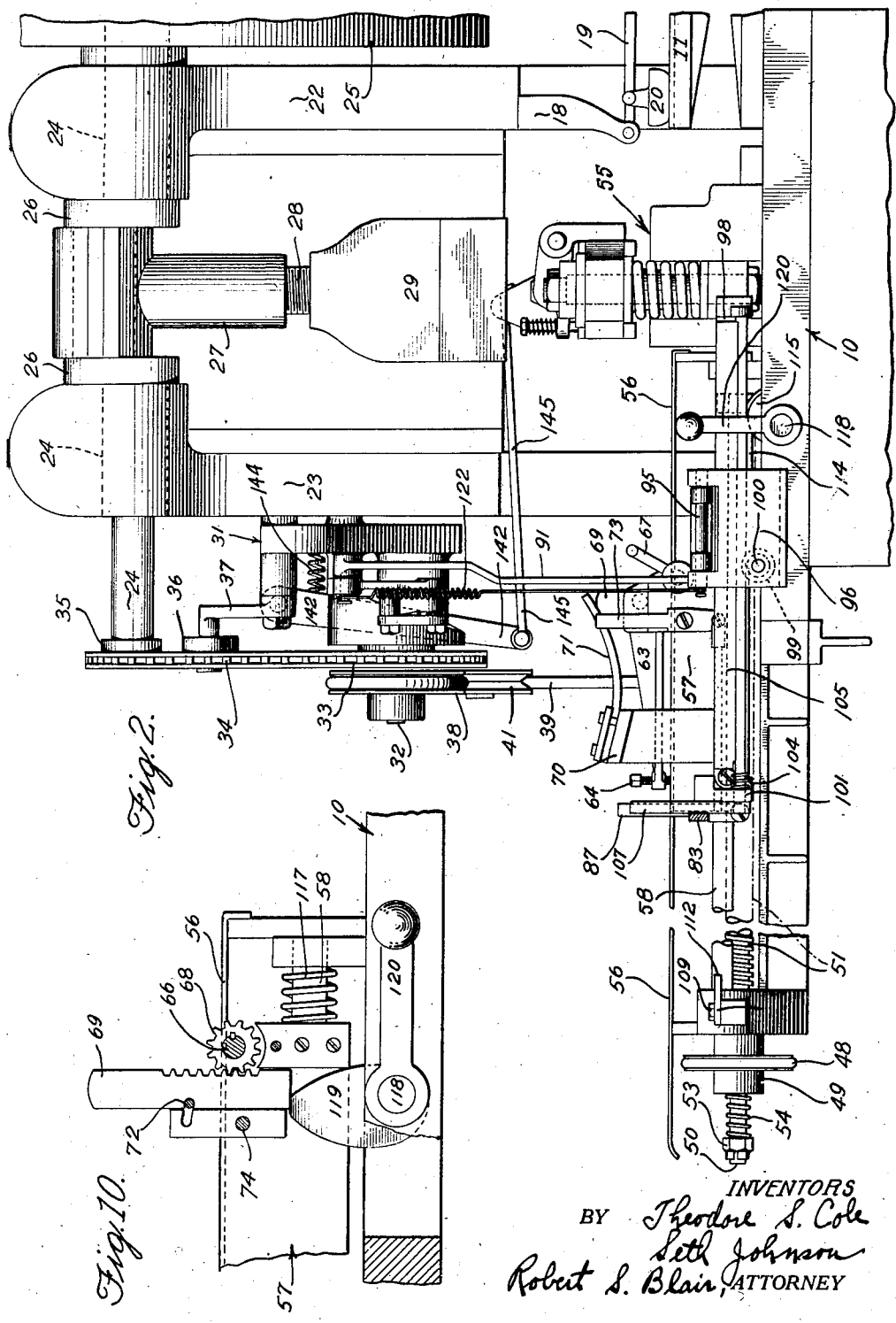
INVENTORS
BY Theodore S. Cole
Seth Johnson
Robert S. Blair, ATTORNEY

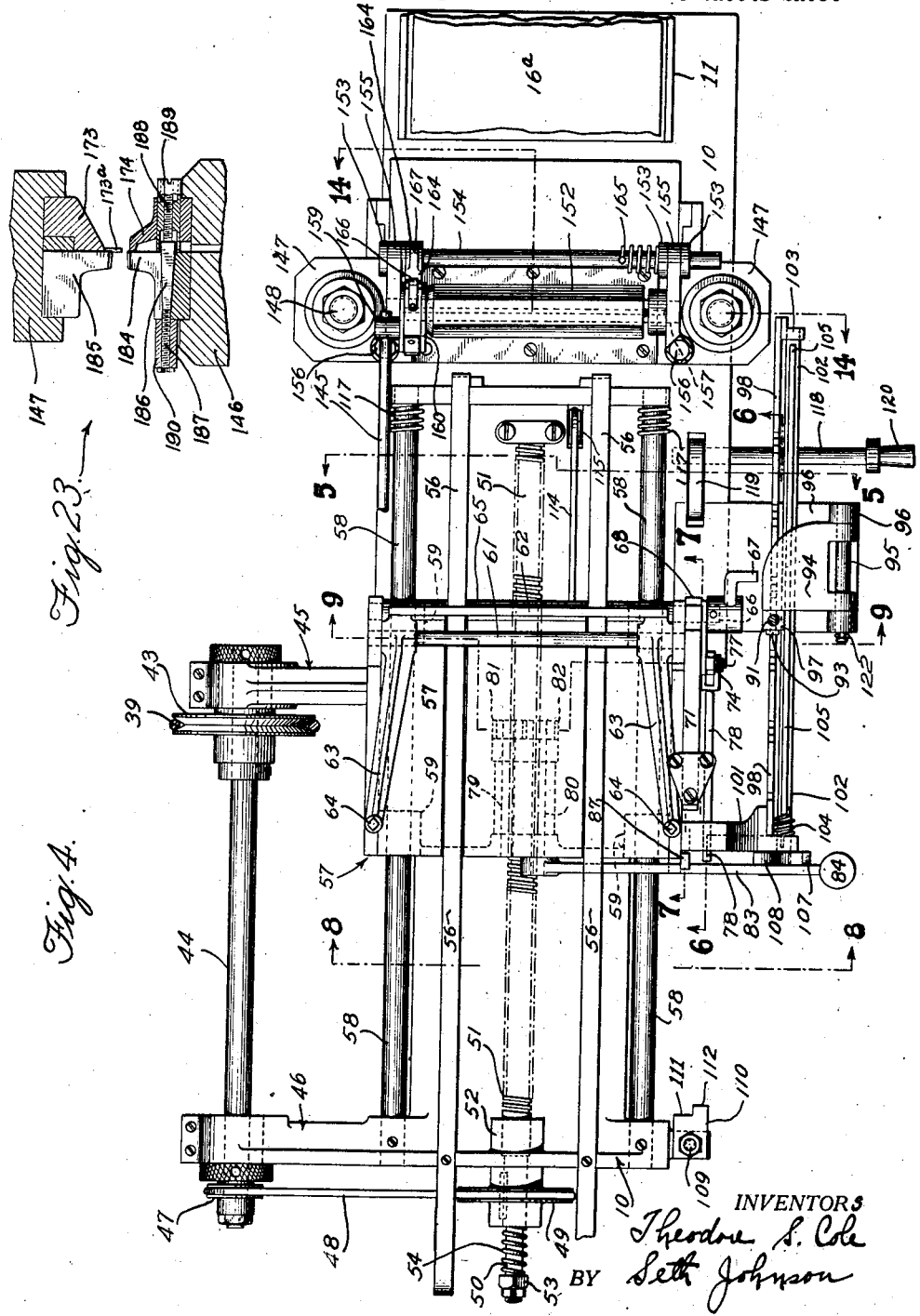

Aug. 16, 1927.

T. S. COLE ET AL 1,639,640

ART OF AND APPARATUS FOR MAKING STORAGE BATTERY PLATES

Filed Aug. 23, 1923

INVENTORS
Theodore S. Cole
BY Seth Johnson
Robert S. Blair, ATTORNEY

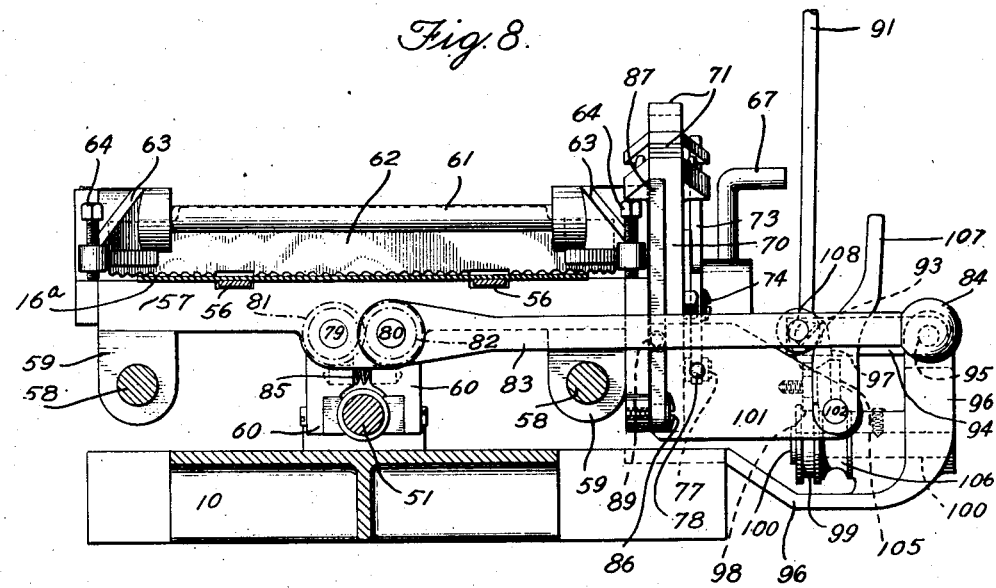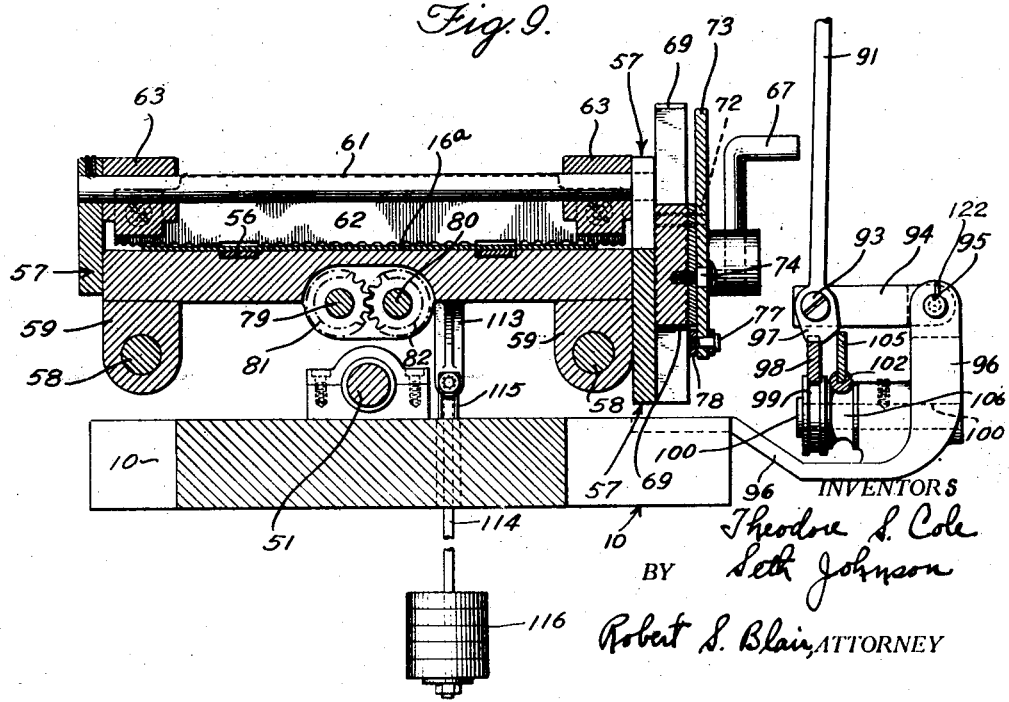

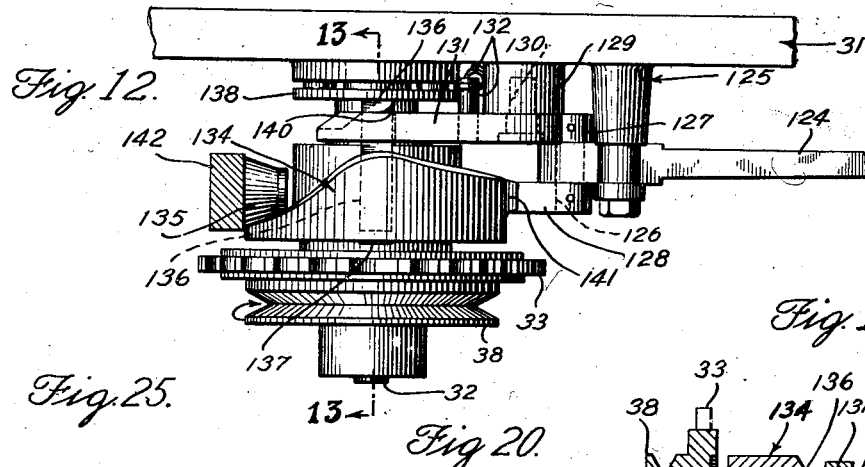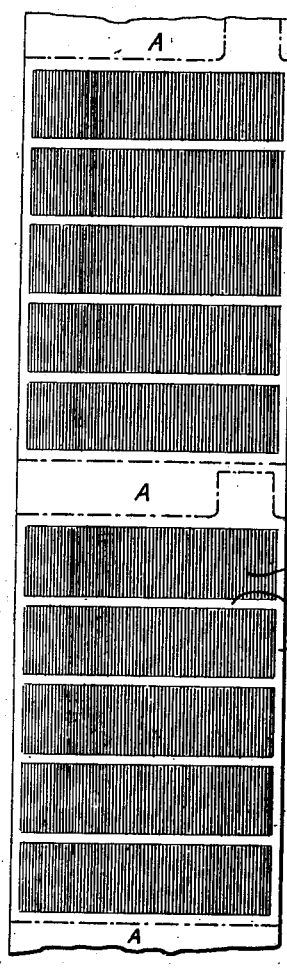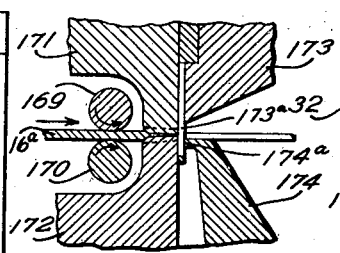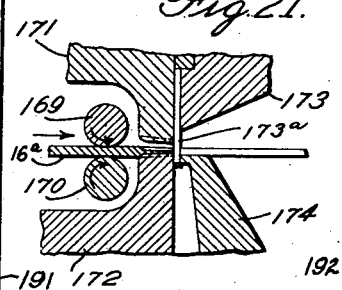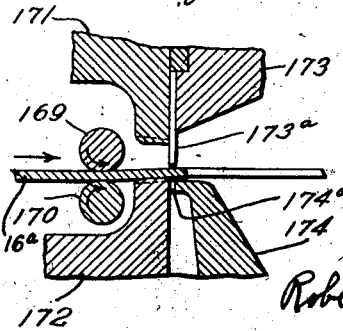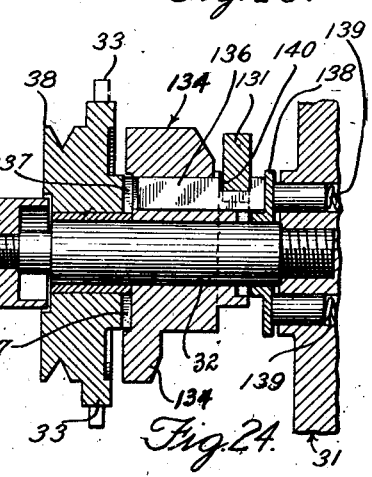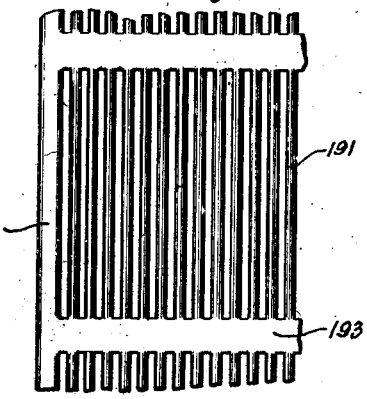

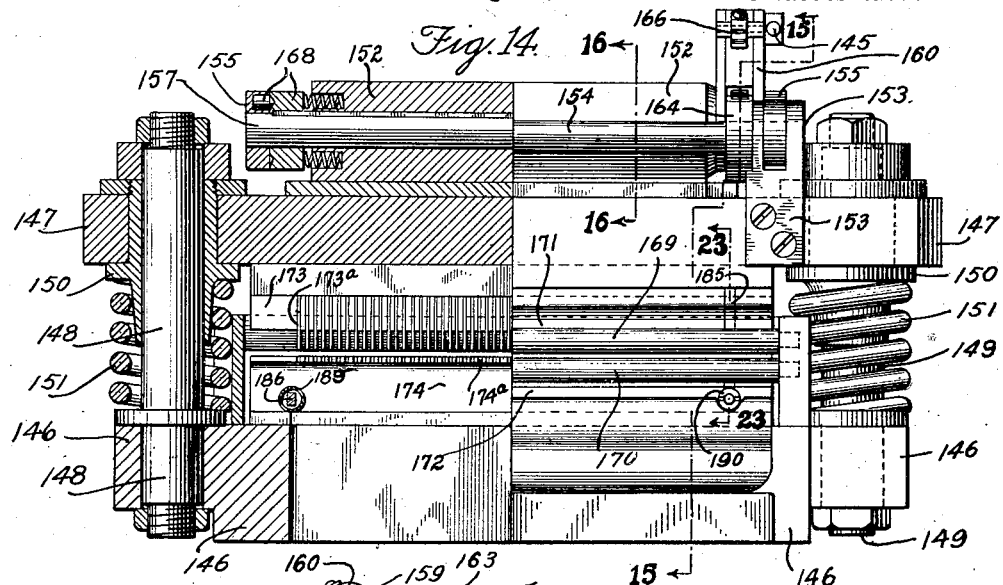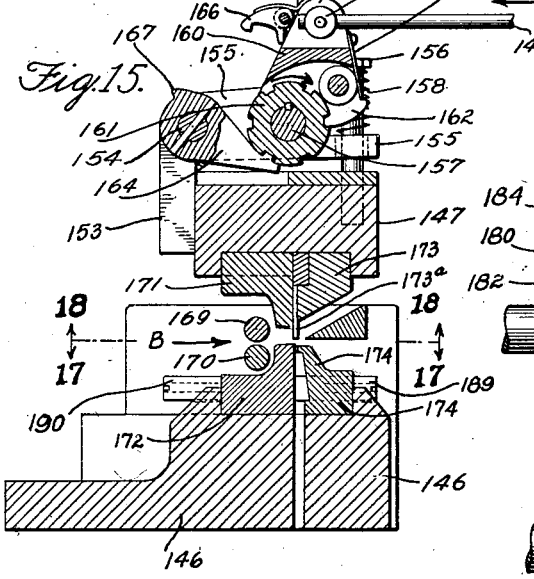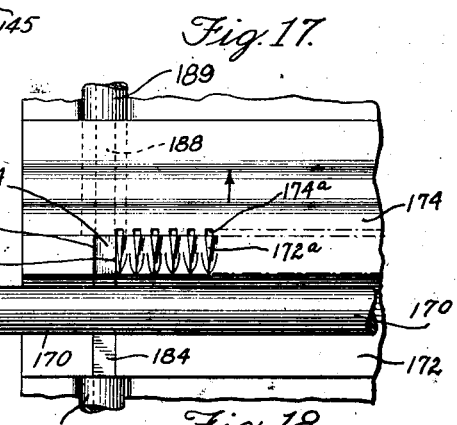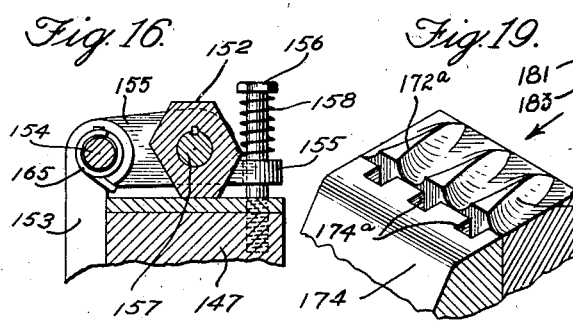

Patented Aug. 16, 1927.

1,639,640

UNITED STATES PATENT OFFICE.

THEODORE S. COLE AND SETH JOHNSON, OF NEW HAVEN, CONNECTICUT, ASSIGNORS TO THE SAFETY CAR HEATING & LIGHTING COMPANY, A CORPORATION OF NEW JERSEY.

ART OF AND APPARATUS FOR MAKING STORAGE-BATTERY PLATES.

Application filed August 23, 1923. Serial No. 658,868.

This invention relates to storage battery plates with reference more particularly to the art of making such plates and apparatus for carrying on their manufacture.

One of the objects of the invention is to provide a practical art of making storage battery plates or grids which may be conveniently and effectively carried on. Another object is to provide such an art readily adaptable to the conditions of practical manufacture and capable of dependably turning out a product of high quality. Another object is to provide apparatus for making plates or grids for storage batteries which is practical and reliable in operation. Another object is to provide apparatus of the above character adapted to operate with rapidity and accuracy. Another object is to provide such apparatus which is simple and dependable in operation and capable of meeting the requirements of practical manufacture in a highly satisfactory manner. Other objects will be in part obvious or in part pointed out hereinafter.

The invention accordingly consists in the combinations of elements, arrangements of parts, features of construction, and in the several steps and order and relation of each of the same to one or more of the others, all as will be illustratively hereinafter described and the scope of the application of which will be indicated in the following claims.

In the accompanying drawings, in which is shown one of the various possible embodiments of the various mechanical features of this invention, Figure 1 is a front elevation of the assembled machine showing a strip of sheet lead in operative relation thereto;

Figure 2 is a front elevation in enlarged detail of the body of the machine shown in Figure 1;

Figure 4 is a plan view of the lower portion of Figure 2 showing the mechanism for feeding the lead strip and the dies through which it is fed, the upper portion of the frame and driving mechanism being omitted to better disclose the structure;

Figure 8 is a section taken along the line 8—8 of Figure 4;

Figure 9 is a section taken along the line 9—9 of Figure 4;

Figure 10 is a view of certain parts shown in Figure 7 showing the parts in a different position and in relation to certain other portions of the machine;

Figure 12 is a plan view of the mechanism shown in Figure 11;

Figure 13 is a section taken along the line 13—13 of Figure 12;

Figure 14 is a sectional view of the dies and associated mechanism, the section being taken along the line 14—14 of Figure 4;

Figure 15 is a section taken along the line 15—15 of Figure 14;

Figure 16 is a section taken along the line 16—16 of Figure 14;

Figures 17 and 18 are fragmentary plan views of the dies, the views being taken in the direction indicated by the respective arrows on the section line shown in Figure 15;

Figure 19 is a perspective showing in enlarged detail a small portion of the die shown in Figure 17;

Figures 20, 21 and 22 are enlarged views of the dies similar to Figure 15 showing the dies in three different positions and the lead sheet being operated upon;

Figure 23 is a section taken along the line 23—23 of Figure 14;

Figure 24 shows a small portion of the sheet lead after passing through the dies; and Figure 25 shows a portion of the strip of sheet lead after leaving the machine.

Similar reference characters refer to similar parts throughout the several views of the drawings.

Figure 1:
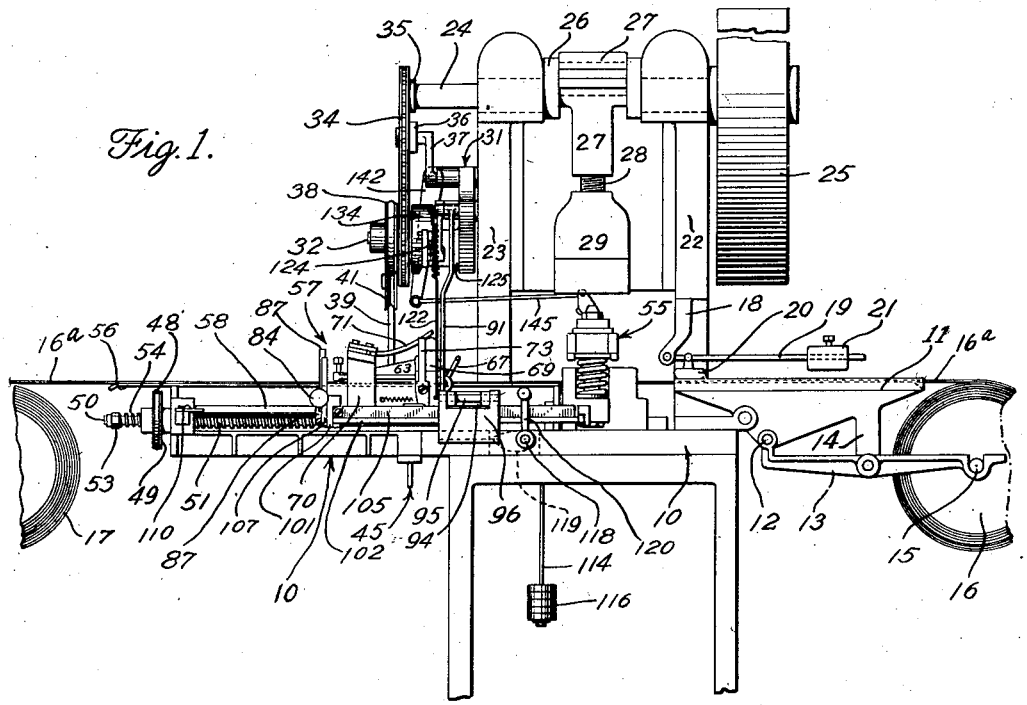

Referring now to the drawings in detail and first to Figure 1, there is shown a main frame 10 upon which the various mechanisms are mounted. At the right hand end of the main frame 10 is mounted a table 11 to which are secured as at 12 a pair of arms 13 which are also supported by dependent lugs as 14. The arms 13 are adapted to support at their outer ends as by means of a shaft 15, a roll 16 of sheet metal preferably of lead of characteristics suitable for use in storage batteries of the lead type. It may be here noted that the strip of sheet lead 16ª comprising the roll 16 is preferably of substantially the thickness and width which it is desired that the completed grids may have. The strip of sheet lead unwinding from the roll 16 is guided across the table 11 and after being drawn through the machine and operated thereon, as will be hereinafter described, passes from the other side of the machine to a receiving roll 17 supported in the desired position and driven by any suitable means. Pivoted upon a lug 18, secured to the upper portion of the frame, is an arm 19 which carries a member 20 in the form of a yielding pad for example, which rests upon the surface of the lead strip to serve as a brake. A weight 21 adjustable upon the outer end of the arm 19 serves to hold the pad 20 firmly against the lead strip so that the strip passing therebeneath over the table 11 may conveniently be given an even, uniform movement.

As shown in Figure 1 and in enlarged detail in Figure 2, a pair of arms 22 and 23 extend upwardly from the rear of the frame 10 and at their upper portions form or provide bearings for a shaft 24. Mounted upon the right hand end of the shaft 24 is a wheel 25 which may serve as a fly wheel and also as a pulley through which the shaft 24 is driven. Between its two bearings in the upright arms 22 and 23, the shaft 24 is provided with a crank 26 upon which is rotatably mounted an arm 27 mounting at its lower end preferably by means of an adjustable threaded connection 28, a ram 29. Thus upon the shaft 24 being rotated, for example from the pulley 25, the ram 29 is given a reciprocating up and down movement.

Figure 3:
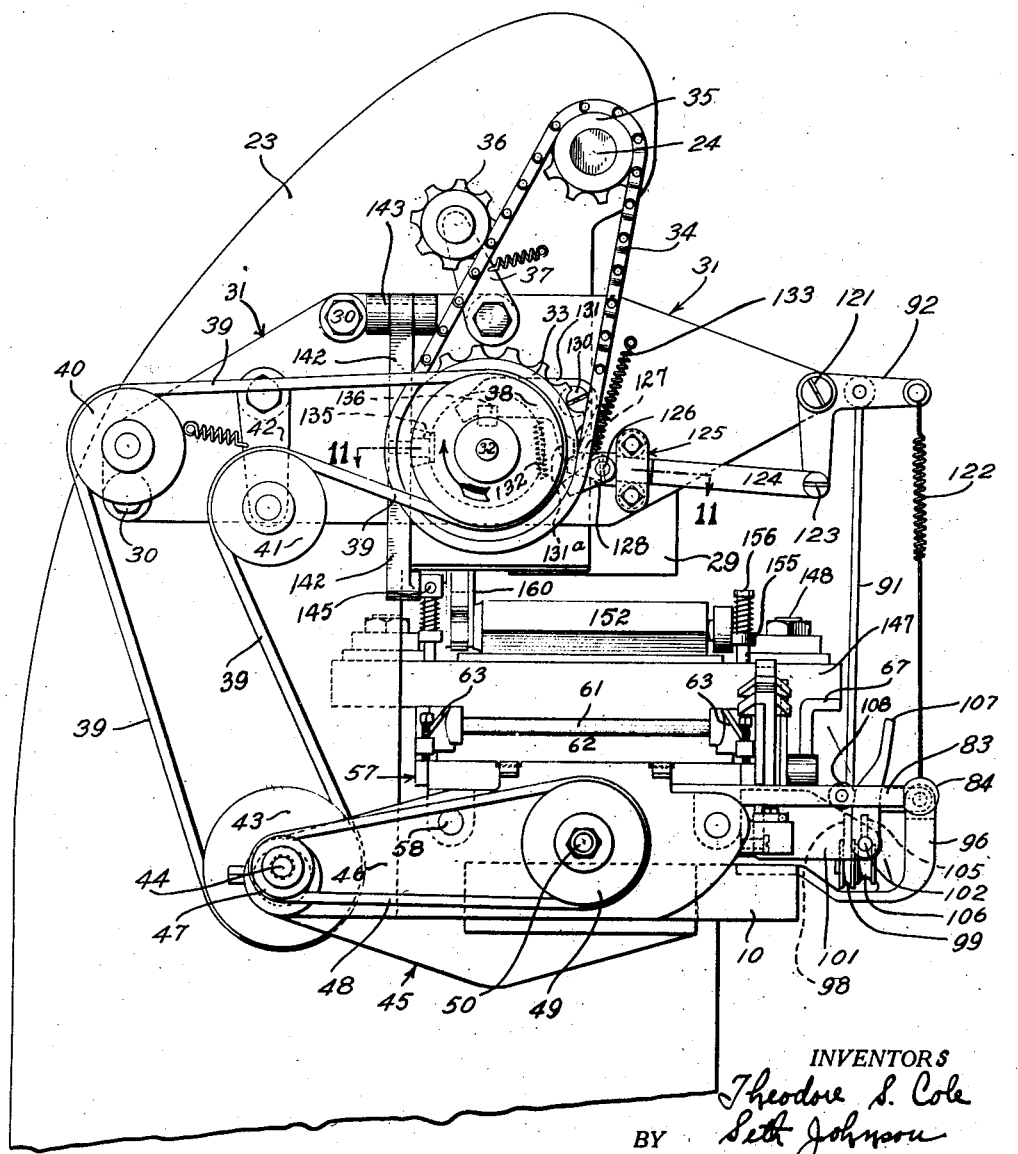
Figure 3 is a side elevation viewed from the left of Figure 2.

Secured to the left hand face of the arm 23, for example by means of bolts as 30, best shown in Figure 3, is a plate member 31 from which extends a projecting shaft 32. Rotatably mounted upon the shaft 32 is a sprocket 33 which is connected in driving relation by means of a chain 34 with a sprocket 35 keyed upon the end of the shaft 24. A tension sprocket 36 is provided, mounted upon a pivoted arm 37 serving to hold the chain 34 taut. A pulley 38 is rotatably mounted upon the shaft 32 exterior of the sprocket 33 and connected in driving relation with the sprocket 33. A belt 39, passing over a pulley 40 and a tension pulley 41 mounted upon a pivoted arm 42, connects the pulley 38 in driving relation with a pulley 43 fast upon a shaft 44.

Referring now to Figure 4, the shaft 44 just mentioned is seen to be mounted in a pair of arms 45 and 46 extending rearwardly from the main frame 10 of the machine. At the left hand end of the shaft 44 is secured a pulley 47 which is connected by a belt 48 with a pulley 49. The bearing for the shaft 44 in the arm 46 is preferably provided with a suitable adjustment for adjusting the position of the shaft 44 to regulate the tension in the belt 48. The pulley 49 is splined upon a shaft 50 which is an extension of a lead screw 51 having a bearing in the frame 10 as at 52. The shaft 50 at its left hand end is provided with a nut 53 pinned thereon between which and the pulley 49 is interposed a coil spring 54. Thus the lead screw 51 is rotated from the main driving shaft 24 through the chain 34, belt 39, shaft 44, belt 48 and the pulley 49 splined upon the extension 50. The purpose of the spring 54 and the spline for the pulley 49 is to permit the drive of the lead screw to yield slightly under certain conditions as will more fully appear hereinafter.

The strip of sheet lead upon leaving the table 11 as before described passes through a pair of dies indicated generally at 55 in Figures 1 and 2 and is thereupon gripped by a feeding mechanism driven by the lead screw 51. As is best shown in Figures 2 and 4, there are provided upon the frame 10 a pair of supports 56 upon which the strip of sheet lead slides as it is drawn through the machine by the feeding mechanism to the receiving roll 17. The feeding mechanism preferably takes the form of a carriage 57, driven by the lead screw 51 and sliding upon a pair of guides 58. As may be seen in Figure 5, the carriage 57 is mounted upon the guides 58 by means of depending lugs as 59. Upon the lower portion of the carriage 57 are mounted a pair of threaded clamping jaws 60 which detachably engage the lead screw 51 and which are shown in the position of disengagement in Figure 5. Pivoted upon a transverse rod 61 on the carriage 57 is a corrugated clamping jaw 62 which is provided with rearwardly extending arms 63 (Figure 4). At the ends of the arms 63 are provided set screws 64 engaging the surface of the carriage 57 and by means of which the position of the clamping jaw 62 may be adjusted. Beneath the clamping jaw 62 is a roll 65 which is eccentrically mounted upon a shaft 66. The shaft 66 has a bearing in each side of the carriage 57 and projecting from the front side thereof is provided with a handle 67. It will be seen that the strip of sheet lead is gripped between the clamping jaw 62 and the eccentric roll 65 and that by turning the eccentric roll the strip may be gripped or released.

Figure 6:
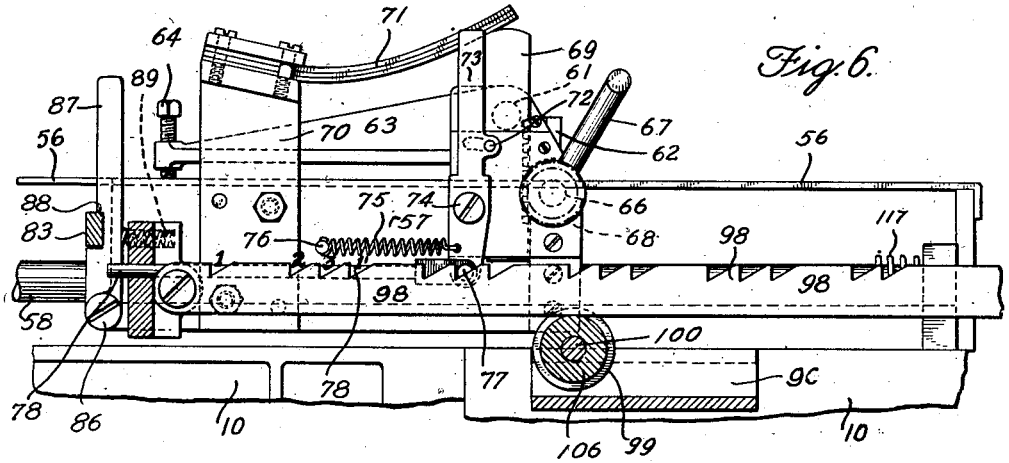
Figure 6 is a section taken along the line 6—6 of Figure 4.
Figure 7:
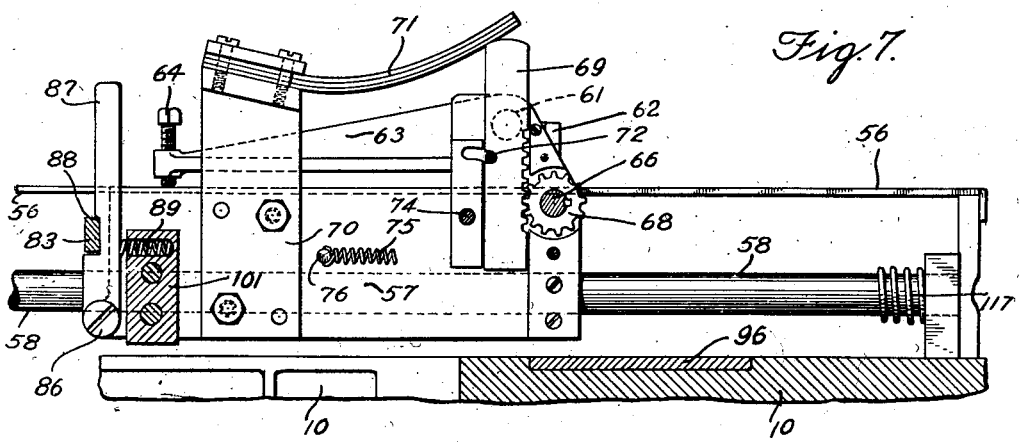
Figure 7 is a section taken along the line 7—7 of Figure 4.

Keyed upon the shaft 66 is a gear 68 in engagement with a vertical rack 69 as is more clearly brought out in Figure 7. A bracket 70 secured to the side of the carriage 57 carries at its upper end a leaf spring 71, the end of which bears against the top of the rack 69 always urging it in a downward direction. The uppermost position of the rack 69 as shown in Figure 7 turns the eccentric roll 65, mounted upon the shaft 66 so that the lead strip is securely gripped between the clamping jaw 62 and the roll 65. The rack 69 is held in such position against the action of the spring 71 by means of a pin 72 engaging a slot in the rack. The pin 72 as shown in Figure 6 is mounted upon a lever 73 which is pivoted upon the side of the carriage 57 as at 74. Thus a rotation of the lever 73 in a counter clockwise direction about its pivot 74 will release the rack 69 permitting it to slide downwardly under the action of the spring 71 thereby turning the eccentric roll 65 through the gear 68 so as to release the grip upon the strip of lead. A spring 75 secured to the side of the carriage as at 76 tends always to turn the lever 73 in a clockwise direction about its pivot 74 to maintain the pin 72 in engagement with the rack 69. Pivoted upon the lower end of the lever 73 as at 77 is a rod 78 extending along the side of the carriage and serving as a mechanism for moving the pin 72 out of engagement with the rack 69 in a manner which will be later described.

Referring now to Figure 8, there is shown the lead screw 51 and the threaded jaws 60 connected to the under portion of the carriage and engaging the lead screw. The jaws 60 are respectively mounted upon shafts 79 and 80 which are rotatably mounted in lugs upon the carriage, and the shafts 79 and 80 are geared together by gears 81 and 82. Fast upon the shaft 80 is an arm 83 extending laterally of the carriage and outwardly to the front of the machine terminating in a suitable handle 84. A coil spring 85 tends always to urge the jaws 60 apart and out of engagement with the lead screw 51, thereby urging the arm 83 to swing upwardly. Pivoted upon the side of the carriage as at 86 is a lever 87, better shown in Figure 7, which is provided with a notch 88 adapted to engage and hold from upward movement the arm 83. A spring 89 resting in a recess in an arm 101 secured to the side of the carriage, bears against the lever 87 urging it into engagement with the arm 83. Thus a clockwise rotation of the lever 87 about its pivot 86 will release the arm 83 from the notch 88 permitting the arm 83 to swing upwardly under the urge of the spring 85, thereby disengaging the jaws 60 from the lead screw 51. These parts are shown in such position of disengagement in Figure 5 before referred to.

A momentary reference back to Figure 3 shows a vertical rod 91 connected at its upper end to a bell crank lever 92 which is pivotally mounted upon the plate member 31. The action of the lever 92 and its connections at its upper end will be hereinafter described. Turning now to Figure 9, the rod 91 is pivotally connected at its lower end as at 93 to a member 94. The member 94 is pivotally mounted as at 95 upon a bracket 96 which is secured to the main frame 10 and projects outwardly therefrom in front of the machine. The rod 91 is provided at its lower end with an index finger 97 adapted to engage the notches in an index bar 98. The index bar 98 is connected with the carriage 57 and moves therewith being supported in a roller 99 mounted upon a stud 100 of the bracket 96. The connection of the index bar 98 with the carriage 57 and the relations of these parts to the bracket 96 may be best seen in Figure 4. Referring to this figure the index bar 98 is mounted upon an arm 101 extending outwardly from the carriage 57. Rotatably mounted in the arm 101 is a rod 102 which extends along the index bar 98 adjacent thereto and at its other end is rotatably mounted in a lug 103 connected to that end of the index bar 98. A coil spring 104 seated in the arm 101 tends to rotate the rod 102 in a direction so that its top portion will swing toward the index bar 98. The rod 102 is provided on its upper surface with a longitudinally extending projection 105 similar in shape to the index bar 98 but having a smooth upper surface. As best shown in Figure 9, the rod 102 is supported by a roller 106 upon the stud 100 of the bracket 96. A rotation of the rod 102 toward the index bar 98 as urged by the spring 104 will cause the projection 105 to swing over beneath the index finger 97 thereby preventing engagement of the index finger with the surface of the index bar 98 and the notches thereof.

Referring now to Figure 8, there is mounted upon the end of the rod 102 a cam shaped lever 107 which is urged by the spring 104 into engagement with a roller 108 mounted upon the arm 83. The lever 107 is so shaped that upon an upward movement of the arm 83, the rod 102 will be rotated under the urge of the spring 104 to swing the projection 105 over under the index finger 97. The parts in such position are clearly shown in Figure 5.

In the operation of the machine, the carriage 57 is started at its extreme right position close to the dies referred to as 55. The strip of sheet lead is gripped by the clamping mechanism of the carriage and the latter, driven by the lead screw 51, moves away from the dies along the guides 58, thereby drawing the lead strip at a substantially uniform rate of feed through the dies. The travel of the carriage 57 from its initial position to the end of its travel is preferably of substantially the required length to form one battery plate or grid, as will be later pointed out. In Figure 4, the carriage 57 is shown approximately half way along its path of travel. In this figure there is shown connected to the main frame 10, as at 109, a cam 110 presenting two surfaces 111 and 112 facing toward the carriage mechanism. The member 110 provides a stop which limits the movement of the carriage 57. Upon the carriage 57 having reached the end of its travel, the lever 87 comes into engagement with the surface 111 of the stop 110 and the end of the rod 78 comes into engagement with the surface 112 of the stop 110. The engagement of the rod 78 with the surface 112, forcing the rod 78 to the right, gives a counterclockwise movement to the lever 73 (Figure 6) which moves the pin 72 from engagement with the rack 69 permitting the spring 71 to rotate the eccentric roll 65 through the rack 69 to then release the grip upon the lead sheet. The engagement of the surface 111 with the lever 87 gives the lever 87 a clockwise rotation which throws the notch 88 out of engagement with the arm 83 permitting the arm 83 to swing upwardly under the urge of the spring 85 (Figure 8) thereby disengaging the jaws 60 from the lead screw 51. This upward movement of the arm 83 being followed by the lever 107 in engagement with the roller 108 results in the swinging over of the member 105 beneath the index finger 97. Thus at the end of the travel of the carriage 57, the grip upon the lead sheet is released, the driving connection of the carriage is released, and the index finger is held away from engagement with the rack 98.

Figure 5:
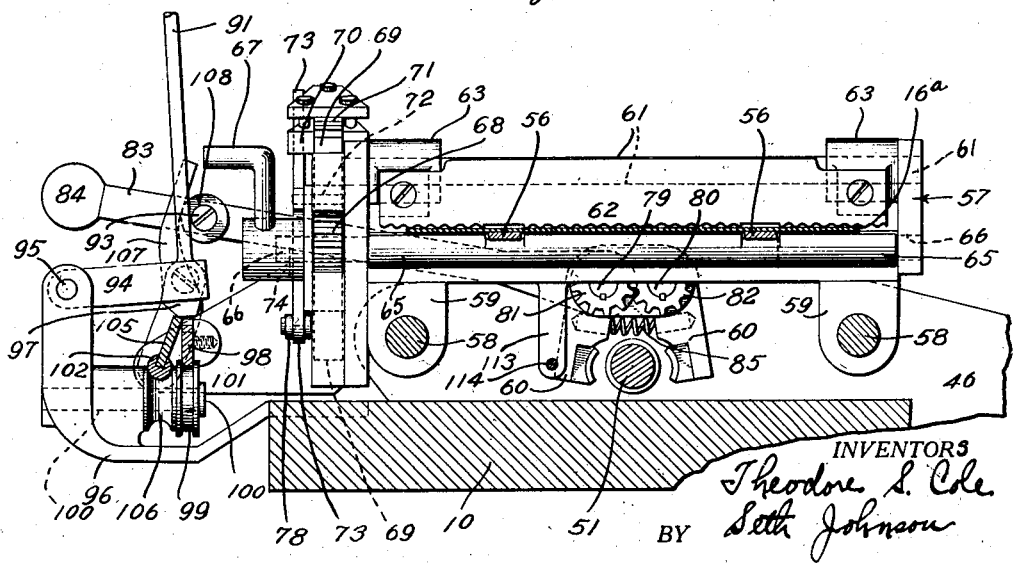
Figure 5 is a section taken along the line 5—5 of Figure 4 showing certain parts out of driving relation.

As shown in Figure 9, connected to a lug 113 on the bottom of the carriage 57 is a cable 114 which passes over a pulley 115, better shown in Figure 4, and terminates in a weight 116. Thus upon the carriage reaching the end of its travel and being automatically released as above described, the weight 116 quickly draws the carriage 57 back to its initial position, the clamping jaws slipping over the lead sheet. As shown in Figure 4, preferably a pair of recoil springs 117 are provided about the right hand ends of the guides 58 to absorb the shock occasioned by the momentum of the returning carriage. The respective positions of the releasing mechanisms of the carriage as it returns under the action of the weight 116 are shown in Figure 5. Now by forcing the handle 84 downwardly, the jaws 60 are again placed in engagement with the lead screw 51 and the member 105 is swung out of the way of the index finger 97. Referring to Figure 10, a portion of the carriage is shown at the extreme right end of its travel and up against the recoil springs 117. Rotatably mounted in the frame 10 is a shaft 118 upon which is mounted on the inner side of the frame 10 a cam 119, and upon the outer side of the frame 10, a handle 120. The cam 119 is so positioned that when the carriage is at the end of its movement to the right, the cam comes directly beneath the rack 69. By means of the handle 120 the cam 119 may be rotated and engaging the rack 69 forces it upwardly thus causing the clamping mechanism to take a new grip upon the strip of sheet lead. The pin 72 thereupon swings into engagement with the rack 69 holding it in position as before described. The carriage is now set to repeat its operation of drawing the lead strip through the dies to form another battery plate.

Figure 11:
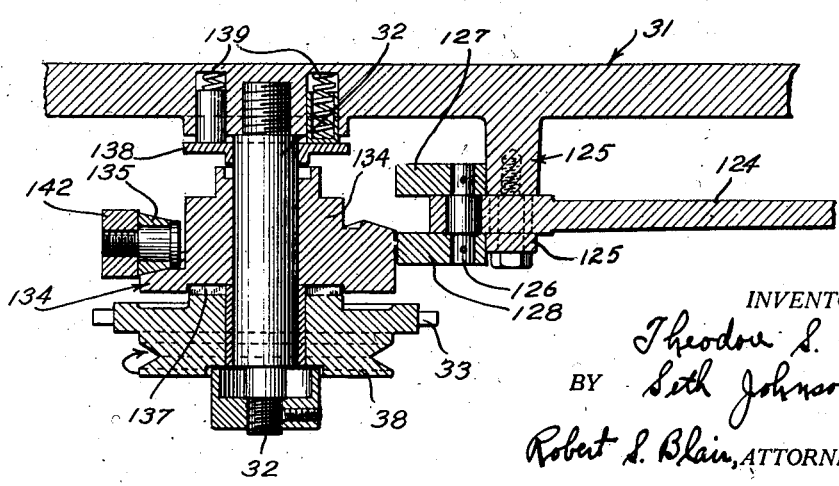
Figure 11 is a section taken along the line 11—11 of Figure 3.

Turning now to Figure 3, the rod 91 at the lower end of which is mounted the index finger 97 is connected at its upper end with the bell crank lever 92 pivoted upon the plate 31 as at 121. A spring 122 connected to one end of the bell crank lever 92 and connected to the bracket 96 urges the rod 91 downwardly and the index finger 97 against the index bar 98. The other end of the lever 92 is connected as at 123 to an arm 124 and thus a downward movement of the rod 91 as the index finger thereon drops into the notches of the index bar, causes a movement to the left of the arm 124 as viewed in Figure 3. The arm 124 slides in a guide 125 provided therefor on the face of the plate member 31. Passing through the end of the arm 124 is a shaft 126 upon which are pinned a pair of members 127 and 128. Figures 11 and 12 show these parts in enlarged detail. Pivoted upon a lug 129 (Figure 12) of the plate 31, as by means of a pin 130, is a latch member 131 which projects over the shaft 32, extending from the plate 31, and which is urged downwardly toward the shaft 32 by a spring 132. As is shown in Figure 3, the latch member 131 has a dependent portion 131$^a$ which is in line with and is adapted to be engaged by the member 127 upon a movement to the left of the arm 124. Thus a movement of the arm 124 to the left through the member 127 will cause a rotation of the latch member 131 about its pivot 130 lifting the latch member upwardly in a direction away from the shaft 32. The member 127 is yieldingly urged upwardly to be in position to engage the part 131$^a$ of the latch 131 by means of a spring 133.

In Figures 11, 12 and 13, there are clearly shown the sprocket 33 and the pulley 38 connected together and rotatably mounted upon the shaft 32. Rotatably mounted upon the shaft 32 between the sprocket 33 and the plate member 31 is a cam member 134 engaged by a follower 135. Slidably mounted in the cam member 134 and passing therethrough substantially parallel with the shaft 32 is a bolt member 136. The hub of the sprocket 33 is provided with recesses 137 adapted to receive the end of the bolt member 136. The other end of the bolt 136 is in engagement with a collar 138 which is urged outwardly from the plate 31 by means of springs 139. The springs 139 thus tend to urge the bolt 136 into engagement with the recesses 137 in the sprocket 33 which is continuously rotated by the chain 34 as earlier described. The bolt 136 is provided with a notch 140 having a tapered side within which notch the latch member 131 rests and into engagement with which it is urged by the spring 132.

Considering now the action of this mechanism just described, each time the index finger 97 drops into a notch in the index bar 98, the arm 124 is given a movement to the left. The latch member 131 is in engagement with the slot 140 in the bolt 136 holding the bolt away from the recesses in the rotating sprocket 33 against the action of the springs 139, and the cam 134 is stationary. Upon the arm 124 moving to the left, the latch member 131 is lifted out of engagement with the notch 140 in the bolt 136 and the bolt is forced by the springs 139 into engagement with a notch 137 in the rotating sprocket 33. Thereupon the cam 134 starts to rotate with the sprocket 33, the rotation being in the direction indicated by the arrow in Figure 12, that is, in a clockwise direction as viewed in Figure 3. Positioned upon the periphery of the cam 134 is a lug 141 which upon the rotation of the cam moves into engagement with the member 128, forcing the latter downwardly against the action of the spring 133. The member 128 and the member 127, being pinned upon the same shaft, the member 127 is likewise forced downwardly so that it is drawn out of engagement with the part 131ª of the latch again permitting the latch 131 to drop into place under the urge of the spring 132. As the cam rotates, the tapered notch 140 of the bolt 136 comes again into engagement with the tapered end of the latch 131 and the bolt 136 is thereby drawn out of engagement with the sprocket 33 as soon as the cam 134 has made one rotation. Thus each time the index finger 97 drops into a notch in the index bar 98, the cam 134 is given one rotation.

Turning again to Figure 3, the cam follower 135 is mounted upon an arm 142 which is pivotally mounted upon the plate member 31 adjacent its upper portion as at 143. As shown in Figure 2, the spring 144 urges the arm 142 outwardly away from the plate member 31 thereby holding the follower 135 always in engagement with the surface of the cam 134. At its lower end, there is connected to the arm 142 a connecting rod 145, passing therefrom substantially laterally to the die members which heretofore have been generally designated by the numeral 55. The cam 134 is so shaped that at each rotation thereof the rod 145 is given a movement toward the die members and thence back again. It may be here noted that the sprockets 35 and 33 are so proportioned preferably that the speed of rotation of the cam 134, driven from the sprocket 33, is substantially one-half the speed of rotation of the main shaft 24. Furthermore, the engagement of the clutch mechanism above described which gives the cam 134 one rotation operates preferably to rotate the cam at a time when the ram 29 is on an up stroke.

Considering now the die mechanism through which the strip of sheet lead is drawn by the carriage mechanism described, referring first to Figure 14, there are shown two main body members, a lower body member 146 which rests upon the frame 10 of the machine and an upper body member 147. These two members 146 and 147 carry the dies which operate upon the lead sheet as it is drawn therebetween. A pair of bolts 148 and 149 connect the two members together, the member 147 being slidably mounted upon the bolts which pass through bushings 150 therein and being urged upwardly away from the member 146 by means of heavy coil springs 151. The dies are intermittently driven toward each other to operate upon the lead strip therebetween, by means of the reciprocating ram 29 hereinbefore described. As may be seen from Figure 2, the dies are positioned directly beneath the ram 29. Resting upon the upper surface of the die body member 147, and interposed between the same and the ram 29 is a member 152 having more than one diameter and preferably taking the form substantially as clearly shown in Figure 16. Referring to this figure, it will be seen that the member 152 has three different thicknesses and that by rotating the member 152 about a horizontal axis, the different diameters thereof may be interposed between the surface of the die member 147 and the reciprocating ram 29. Thus by rotating and thereby changing the position of the member 152, the length of stroke of the dies actuated by the strokes of the ram may be varied. There is secured to the side of the die member 147, a pair of upstanding brackets 153 in which is rotatably mounted a transverse shaft 154. Supported upon this shaft 154 is a pair of members 155 which extend transversely across the die member 147 and which are provided at their ends with openings through which pass stud bolts 156 threaded into the member 147. The member 152 is keyed upon a shaft 157 and the shaft 157 has bearings at each end in the members 155. The members 155 are rotatable upon the shaft 154 and at their other ends are slidable on the bolts 156. A pair of springs 158 coiled about the bolts 156 urge the members 155 downwardly about the shaft 154 so that the member 152 is always held against the surface of the member 147 and may yet be readily rotated.

The member 152 having the three different diameters is rotated intermittently from the connecting rod 145, which, as above described, is given a movement back and forth each time the index finger 97 drops into a notch in the index bar 98. Referring now to Figure 15, the rod 145 is connected at 159 to a rocker arm 160 rotatably mounted upon the shaft 157. Keyed upon the shaft 157 is a ratchet 161 and in engagement with the ratchet 161 is a dog 162 mounted upon the rocker arm 160 and held in engagement with the ratchet by means of a spring 163. Pinned upon the shaft 154 is a locking dog 164 held in engagement with the ratchet 161 by means of a coil spring 165, shown in Figure 16. The rod 145 is given a movement in the direction indicated by the arrow in Figure 15 by a rotation of the cam 134, as described, and is thereupon drawn back in the reverse direction by the action of the spring 144 (Figure 2). Upon the movement of the rod 145 and the rocker arm 160 to the left, as viewed in Figure 15, the dog 162 slips along the ratchet 161 to the next tooth. A latch 166 mounted upon the rocker arm 160 engages a lug 167 upon the locking dog 164. Upon the movement of the rod 145 and the rocker arm 160 to the right, the locking dog 164 is drawn out of engagement with the ratchet 161 by the latch 166 and the ratchet is turned in the direction indicated by the arrow, by the dog 162. Upon the rod 145 having moved to the right a short distance, it will be seen, the latch 166 moving upwardly from the lug 167 slips out of engagement therewith and the locking dog 164 is permitted to move back against the surface of the ratchet 161, under the urge of its spring, in readiness to drop into the next depression of the ratchet. Preferably there are six teeth on the ratchet 161 and therefore each movement back and forth of the connecting rod 145 gives the member 152, keyed upon the shaft 157, one-sixth of a revolution. Therefore at each consecutive movement of the connecting rod 145, or in other words, each time the index finger 97 drops into a notch in the index bar 98, a different diameter of the member 152 is interposed between the ram 29 and the surface of the die member 147 to vary the stroke of the die. As shown in Figure 14, the supporting member 155 at the end of the member 152, remote from the ratchet mechanism, is preferably provided with resilient retaining devices 168 to facilitate the correct positioning of the member 152 as it is rotated.

The lead sheet is drawn through between the die members in the direction indicated by the arrow B in Figure 15, passing first between a pair of rollers 169 and 170, the mounting of which upon the lower body member 146 is shown in Figure 14. Secured to the upper body member 147 is a transverse die block 171 and opposite thereto secured to the lower body member 148 is a corresponding block 172. The members 171 and 172 are each provided with a transverse row of oppositely disposed projections 171$^a$ and 172$^a$, respectively, arranged as shown in Figures 17 and 18. The shape of the individual projections may be better realized by reference to Figure 19 wherein there is shown a fragment of the die block 172. The lead strip advances through between the dies in the direction indicated by the arrow in Figure 19 and it will be seen that the effect of the coacting projections 171$^a$ and 172$^a$ upon the dies 171 and 172 is to swage the metal of the sheet forcing the metal backwardly away from the dies or in a direction opposite to that in which the sheet is fed. The spaces between the adjacent die projections are rounded as shown in Figure 19 so that the effect of the swaging action upon the metal is to form therein a set of rounded ribs as the sheet is fed between the intermittently moving dies. The swaging action leaves between the adjacent ribs a thin web of lead. Close against the die member 171 is a member 173 which supports a transverse row of punching members 173$^a$ in line with the swaging projections 171$^a$ of the die member 171. Close against the die member 172 is a transverse member 174 provided with a row of apertures 174$^a$ positioned to receive the punching members 173$^a$ of the member 173. Thus as the die members intermittently come together under the action of the ram 29 and the swaging dies and the punching dies are both operative upon the metal, the lead is simultaneously displaced or stretched longitudinally by the swaging member and punched by the punches 173$^a$ to form therein a plurality of spaced parallel longitudinal bars of rounded contour, as the lead sheet moves through the dies. The feed of the lead strip is slow compared to the action of the dies, the length thereof which is fed between successive strokes of the dies being preferably substantially less than the length of the swaging projections.

As has been mentioned above, the strip of sheet lead 16$^a$ is of substantially the width which it is desired that the completed plates or grids may have. In order to provide suitable reenforcement for the completed plates, it is desirable that the transverse rows of longitudinal bars be not formed all the way across the strip but that there be left at each side a reenforcing strip of metal forming a sort of framework for the plate. To this end the punching and swaging die members above described do not extend to the sides of the strip of lead but leave a width of metal on either side. As viewed in Figures 17 and 18, the strip of sheet lead fits substantially between the line 180 and 181 and corresponding lines at the other side of the dies, while the swaging and punching members extend only to the lines 182 and 183. Thus in the portions of the strip of sheet lead which pass between these lines at either side, there are no ribs formed. Since, as above described, the metal between these two side portions is swaged and displaced longitudinally to form the parallel bars, it is desirable that these side portions be stretched correspondingly. Therefore, at each side of the die member 172 between the lines 182 and 180 indicated in Figure 17 are positioned members 184, and at each side of the die member 171 between the lines 181 and 183 indicated in Figure 18 are positioned members 185, which members 184 and 185 serve to swage or stretch the side portions of the lead strip at either side of the parallel bars to correspond with the stretching of the intermediate portion in which the parallel bars are formed. These two members 184 and 185 are best shown in Figure 23. Referring now to this figure, the member 185 is shown supported upon the upper body member 147 and the member 184 is shown supported upon the lower body member 146. The member 184 is provided with a vertical adjustment which preferably takes the form of a wedge like member 186. The member 186 is provided with threaded projections 187 and 188 and adjusting nuts 189 and 190. By manipulation of the adjusting nuts 189 and 190, the member 186 may be moved to the right or to the left, as viewed in Figure 23, thereby raising or lowering the member 184 with respect to the upper member 185. The opposing sloping surfaces of the members 184 and 185, thus engaging the side portions of the lead strip stretch these portions in the direction in which the metal is stretched by the swaging dies to form the parallel bars and by adjustment of the member 184 the amount of this stretching of the side portions may be regulated to correspond with the amount of stretching done in the formation of the parallel bars. Figure 24 shows a small portion of the lead strip after passing through the dies showing the transverse row of longitudinal bars 191 of rounded cross-section which are formed by the swaging and punching dies and the side portion 192 which is stretched by the action of the members 184 and 185.

In forming the storage battery plates or grids, it is desirable that the transverse rows of longitudinal parallel ribs or bars be formed in sets with intervening transverse reenforcing ribs. Therefore, as the strip of sheet lead is continuously fed between the dies, the operation of the dies thereon is intermittently interrupted. However, in order that clean slots may be cut between adjacent ribs throughout their length, it is desirable that the punching action continue for a certain interval after the swaging action has ceased, to permit the punches to completely remove the webs of lead from between the adjacent ribs. As has been pointed out in detail above, the block 152, rotatably mounted on top of the dies, provides for three different lengths of stroke of the dies. Figures 20, 21 and 22 show the positions of the dies at the ends of the three different strokes and the lead sheet therebetween. As shown in Figure 20, the punching dies and the swaging dies are simultaneously effective. As shown in Figure 21, the swaging dies are ineffective and the punching dies are effective to remove the web left by the last effective strokes of the swaging dies. In Figure 22, the swaging dies and the punching dies are both ineffective to leave the transverse reenforcing ribs in the sheet.

As has been described, the rotation of the member 152 upon the top of the dies is brought about by the dropping of the index finger 97 into the notches of the index bar 98. The index bar 98 and the notches formed therein are clearly shown in Figure 6. At the start of the operation of forming a plate or grid, the carriage 57 is at the extreme right hand end of its movement and the index finger 97 rests upon the index bar 98 to the left of the notch 1. At this point the member 152 on top of the dies is positioned to interpose its minimum diameter between the dies and the ram so that there is no movement of the dies and as is shown in Figure 22, the swaging and punching dies are both inoperative. As the carriage moves away from the dies, drawing the lead strip therethrough, the index bar 98 moving therewith, the index finger 97 drops into notch 1, whereupon the member 152 is given one-sixth of a revolution so that its maximum diameter is interposed between the dies and the ram. The extent of the stroke of the dies is now as shown in Figure 20, the swaging and punching dies being simultaneously operative to form spaced longitudinal bars in the lead sheet as it moves therethrough. Upon the carriage having moved to a sufficient distance to draw sufficient of the lead strip past the dies as desired to form therein a set of bars of substantially the desired length, the index finger 97 drops into the notch 2. Thereupon the member 152 is given one-sixth of a revolution so that its intermediate thickness is interposed between the dies and the ram and the extent of movement of the dies is substantially as shown in Figure 21. The punching dies alone now operate to remove the web formed by the last strokes of the swaging dies and thereupon the index finger drops into the notch 3. The minimum thickness of the member 152 is thereby again made operative and the dies do not operate upon the lead at all, while the carriage is moving a sufficient distance to form the desired transverse supporting rib. Thereupon the index finger drops into the notch 1' and the operation is repeated. Preferably, as shown in Figure 25, each plate comprises five sets of bars 191 with intervening transverse reenforcing bars 193. The last notch in the index bar 98 into which the index finger 97 drops, turns the member 152 to the position in which the swaging and punching dies are both inoperative and the latter part of the movement of the carriage before reaching its stop, serves to form a wider connecting rib, marked A in Figure 25, in which the desired lug for the battery plate may be cut out as indicated in dotted lines.

As has been described above, the strip of sheet lead 16ª after being drawn between the dies and operated upon is wound upon a receiving roll 17. The lead as wound upon the roll 17 is substantially as shown in Figure 25, having been formed into a plurality of transverse sets of longitudinal bars 191 with intervening transverse ribs 193, the groups of parallel bars being divided up into sets of five groups by the wider transverse portions A. From the receiving roll 17, the metal may be removed and cut in any desired manner into the individual plates or grids.

From the above, it will be seen that there are herein provided an art of making storage battery grids and an apparatus for carrying out the processes which embody the features of this invention and attain the objects thereof. The art is one which is practical and effective and well adapted for application to practical manufacture and the apparatus is one which is capable of dependable and efficient operation throughout. The product obtained is one which embodies a great many decidedly practical and important advantages.

As various possible embodiments might be made of the above invention and as the art herein set forth might be varied and as the apparatus might be changed in various ways all without departing from the scope of the invention, it is to be understood that all the matter herein set forth or shown in the accompanying drawings is to be interpreted as illustrative and not in a limiting sense.

We claim as our invention:—

1. In apparatus of the general nature of that herein described, in combination, a reciprocating die member adapted to operate upon sheet metal and having a row of spaced projections adapted to enter said sheet and displace the metal thereof, the surface of said die member between said projections being rounded so as to form rounded ribs in said sheet between the portions thereof which said projections enter, and means for actuating said die.

2. In apparatus of the general nature of that herein described, in combination, a tool, means for supporting a sheet metal member in operative relation thereto, means for actuating said tool to operate upon said sheet metal member, and means associated with said tool adapted to displace the metal of said sheet metal member at a plurality of spaced portions to form therein a plurality of spaced bars of substantially circular cross-section.

3. In apparatus of the general nature of that herein described, in combination, a tool, means for supporting a sheet metal member in operative relation thereto, means for actuating said tool to operate upon said sheet metal member, and means associated with said tool adapted to displace the metal of said sheet metal member at a plurality of spaced portions thereof in a substantially longitudinal direction lengthwise of said sheet metal member to form therein a plurality of substantially longitudinal spaced bars extending lengthwise of said sheet metal member.

4. In apparatus of the general nature of that herein described, in combination, a die member adapted to operate upon sheet metal and having a plurality of projections arranged side by side in a row transversely of the surface of the die and adapted to enter the metal of said sheet, said projections being shaped to displace the metal and force the metal in a direction longitudinally of the surface of the die, and means for actuating said die.

5. In apparatus of the general nature of that herein described, in combination, a tool, means for supporting a sheet metal member in operative relation thereto, means for actuating said tool to operate upon said sheet metal member, and means associated with said tool adapted to simultaneously swage and punch the metal of said sheet metal member at a plurality of spaced portions to form therein a set of substantially parallel bars substantially circular in cross-section.

6. In apparatus of the general nature of that herein described, in combination, a pair of relatively movable members adapted to receive therebetween a sheet metal member, means for actuating said members, and means associated with said members adapted to displace the metal of said sheet member at a plurality of spaced portions to form therein a plurality of spaced bars substantially circular in cross-section.

7. In apparatus of the general nature of that herein described, in combination, a pair of relatively movable members adapted to receive therebetween a sheet metal member, means for actuating said members, and means associatd with said members adapted to operate upon said sheet metal member at a plurality of spaced portions to longitudinally displace the metal thereof and form therein a plurality of spaced bars extending longitudinally in the direction of said metal displacement.

8. In apparatus of the general nature of that herein described, in combination, a die member adapted to operate upon sheet metal and having a plurality of projections adapted to enter said sheet and displace the metal thereof, the outer surfaces of said projections tapering in width from one end to the other thereof, and means for actuating said die.

9. In apparatus of the general nature of that herein described, in combination, a pair of die members adapted to receive therebetween a lead sheet, oppositely disposed members upon said die members adapted to displace the metal of said lead sheet at spaced portions to form therein spaced ribs, means upon said die members adapted to pierce the metal between said spaced ribs, and means for actuating said dies.

10. In apparatus of the general nature of that herein described, in combination, a pair of die members adapted to receive therebetween a lead sheet, means for actuating said die members to operate upon said sheet, and coacting members upon said die members having substantially rounded contours adapted upon actuation to engage said sheet at spaced portions to form therein spaced bars of rounded contour.

11. In apparatus of the general nature of that herein described, in combination, a pair of die members adapted to receive therebetween a lead sheet, means for actuating said die members to operate upon said sheet, and a transverse row of coacting members upon each of said die members adapted upon actuation to displace the metal of said sheet metal members to form therein a transverse row of spaced bars each of substantially circular cross-section.

12. In apparatus of the general nature of that herein described, in combination, a pair of die members adapted to receive therebetween a lead sheet, means for actuating said die members to operate upon said sheet, and coacting means upon said die members forming a row of spaced swaging devices and a row of spaced punching devices adapted upon actuation to swage and punch the metal of said lead sheet to form therein a row of spaced bars.

13. In apparatus of the general nature of that herein described, in combination, a pair of die members adapted to operate upon a sheet metal member therebetween, and means for actuating said die members comprising a driving member intermittently engaging one of said die members.

14. In apparatus of the general nature of that herein described, in combination, a pair of die members adapted to operate upon a sheet metal member therebteween, and means for actuating said die members comprising a reciprocating ram intermittently engaging one of said members.

15. In apparatus of the general nature of that herein described, in combination, a pair of die members adapted to operate upon a sheet metal member therebetween, means adapted to move one of said die members toward the other, and means adapted to vary the extent of said movement.

16. In apparatus of the general nature of that herein described, in combination, a pair of die members adapted to operate upon material therebetween, means adapted to actuate said die members to operate upon said material, and means adapted to vary the extent of said actuation comprising a member of variable thickness interposed between said actuating means and said dies.

17. In apparatus of the general nature of that herein described, in combination, a pair of die members adapted to operate upon material therebetween, a driven member adapted to move one of said dies toward the other, and a member of variable thickness interposed between said driven member and said die member to vary the extent of said movement.

18. In apparatus of the general nature of that herein described, in combination, a pair of die members adapted to operate upon material therebetween, resilient means urging said dies apart, and a driven member adapted intermittently to engage one of said dies and move it toward the other against the action of said resilient means.

19. In apparatus of the general nature of that herein described, in combination, a pair of die members adapted to operate upon sheet metal interposed therebetween, means for actuating said dies to operate upon said sheet, means upon said dies adapted upon actuation to perform a swaging operation upon said sheet, means upon said dies adapted upon actuation to perform a punching operation upon said sheet, and means for controlling said actuation to render one of said operations effective without the other.

20. In apparatus of the general nature of that herein described, in combination, a pair of die members adapted to operate upon sheet metal interposed therebetween, means for actuating said dies to operate upon said sheet, means upon said dies adapted upon actuation to perform a swaging operation upon said sheet, means upon said dies adapted upon actuation to perform a punching operation upon said sheet, and means comprising a member of variable thickness interposed between said actuating means and said dies adapted to control the actuation of said dies to render one of said operations effective without the other.

21. In apparatus of the general nature of that herein described, in combination, a pair of dies adapted to operate upon a metal sheet interposed therebetween, a driven member adapted to actuate said dies, means upon said dies adapted upon actuation to perform a swaging operation upon said sheet, means upon said dies adapted upon actuation to perform a punching operation upon said sheet, and means associated with said driven member and said dies adapted to control the actuation of said dies to render effective simultaneously said swaging and punching means, or to render ineffective said swaging means and effective said punching means, or to render ineffective both said swaging means and said punching means.

22. In apparatus of the general nature of that herein described, in combination, a pair of dies adapted to operate upon a metal sheet interposed therebetween, a driven member adapted to actuate said dies, means upon said dies adapted upon actuation to perform a swaging operation upon said sheet, means upon said dies adapted upon actuation to perform a punching operation upon said sheet, and automatic means adapted to control said actuation by said driven member to intermittently render effective the simultaneous operation of said swaging means and said punching means, and the operation of said punching means alone.

23. In apparatus of the general nature of that herein described, in combination, a pair of dies adapted to operate upon a metal sheet interposed therebetween, a driven member adapted to actuate said dies, means upon said dies adapted upon actuation to perform a swaging operation upon said sheet, means upon said dies adapted upon actuation to perform a punching operation upon said sheet, and automatic means adapted to control said actuation by said driven member to first render said swaging means and said punching means simultaneously effective, to then render said swaging means ineffective and said punching means effective, and to then render both said swaging means and said punching means ineffective.

24. In apparatus of the general nature of that herein described, in combination, a pair of die members adapted to operate upon material therebetween, a driven member moving in a predetermined path, and adjustable means connected to one of said die members providing a connection of variable length between said die member and the path of said driven member, said means being adapted to be intermittently engaged by said driven member to urge said die member toward the other.

25. In apparatus of the general nature of that herein described, in combination, a pair of die members adapted to operate upon material therebetween, a driven member moving in a predetermined path, a member having more than one diameter rotatably mounted upon one of said die members and adapted to project into the path of said driven member to be engaged thereby and move said die member toward the other, and means for rotating said last member.

26. In apparatus of the general nature of that herein described, in combination, a pair of die members adapted to operate upon material therebetween, a driven member moving in a predetermined path, a member having more than one diameter rotatably mounted upon one of said die members and adapted to project into the path of said driven member to be engaged thereby and move said die member toward the other, resilient means urging said last member into engagement with said die member, and means for rotating said last member.

27. In apparatus of the general nature of that herein described, in combination, a pair of die members adapted to operate upon material therebetween, a driven member intermittently moving toward one of said die members, a member having more than one diameter rotatably mounted upon one of said die members and adapted to project into the path of said moving member to be engaged thereby to move said die member toward the other, and automatic means adapted at predetermined intervals to rotate said last member to intermittently interpose different diameters thereof between said driven member and said die member.

28. In apparatus of the general nature of that herein described, in combination, a tool member, means adapted to intermittently move said tool member to operate upon a metal sheet, and automatic means associated with said last means adapted at predetermined intervals to vary the length of said movement of said tool.

29. In apparatus of the general nature of that herein described, in combination, a tool member, means adapted to move a metal sheet past said tool member, means adapted to intermittently move said tool to operate upon said sheet, and means adapted at intervals to vary the length of said movement of said tool as said sheet is moved past the same.

30. In apparatus of the general nature of that herein described, in combination, a tool member, means adapted to move a metal sheet past said tool member, means adapted to intermittently move said tool to operate upon said sheet, and means governed by the movement of said sheet adapted at intervals to vary the length of movement of said tool.

31. In apparatus of the general nature of that herein described, in combination, a die member, means adapted to move a lead sheet past said die member, means adapted to actuate said die member to operate upon said moving sheet, means upon said die member adapted upon actuation to perform a swaging operation upon said sheet, means upon said die member adapted upon actuation to perform a punching operation upon said sheet, and means governed by the movement of said sheet adapted to vary the actuation of said die to render one of said operations effective without the other.

32. In apparatus of the general nature of that herein described, in combination, a die member, means adapted to move a lead sheet past said die member, means adapted to actuate said die member to operate upon said moving sheet, means upon said die member adapted upon actuation to perform a swaging operation upon said sheet, means upon said die member adapted upon actuation to perform a punching operation upon said sheet, and means governed by the movement of said sheet adapted at intervals to vary the actuation of said die to first render said swaging means and said punching means simultaneously effective, to then render said swaging means ineffective and said punching means effective, and to then render said swaging means ineffective and said punching means ineffective.

33. In apparatus of the general nature of that herein described, in combination, a tool member, means adapted to feed a lead sheet past said tool member, means adapted to intermittently actuate said tool to operate upon said moving lead sheet, and means associated with said tool member adapted upon actuation to engage said moving lead sheet at a plurality of spaced portions to form therein a plurality of spaced longitudinal slots.

34. In apparatus of the general nature of that herein described, in combination, a tool member, means adapted to feed a lead sheet past said tool member, means adapted to intermittently actuate said tool to operate upon said moving lead sheet, and means associated with said tool adapted upon actuation to engage said sheet at a plurality of spaced portions and displace the metal thereof in a direction substantially in line with the direction of feed of said sheet to form therein a plurality of spaced longitudinal ribs.

35. In apparatus of the general nature of that herein described, in combination, a tool member, means adapted to feed a lead sheet past said tool member, means adapted to intermittently actuate said tool to operate upon said moving lead sheet, means associated with said tool adapted upon actuation to engage said sheet at a plurality of spaced portions and displace the metal thereof to form therein a plurality of spaced ribs connected by relatively thin webs of metal, and means associated with said tool adapted upon actuation to remove said webs of metal.

36. In apparatus of the general nature of that herein described, in combination, a tool member, means adapted to feed a lead sheet past said tool member, means adapted to intermittently actuate said tool member to operate upon said moving sheet, means associated with said tool member adapted upon actuation to operate upon said moving lead sheet at spaced portions to form therein a set of substantially parallel longitudinal bars, and means adapted to interrupt the operation of said last means to form in said lead sheet transverse reenforcing bars.

37. In apparatus of the general nature of that herein described, in combination, a pair of die members, means for feeding a strip of sheet lead between said die members, means for actuating said die members to operate upon said moving strip, means upon said die members adapted upon actuation to operate upon said strip intermediate its side portions to longitudinally displace the metal thereof and form therein longitudinal ribs, and means upon said die members adapted upon actuation to operate upon said side portions of said strip to longitudinally displace the metal thereof.

38. In apparatus of the general nature of that herein described, in combination, a delivery roll adapted to carry a strip of sheet lead wound thereon, a tool adapted to operate upon said strip of sheet lead, means adapted to feed said strip of sheet lead past said tool in operative relation thereto, and a receiving roll adapted to receive said strip of sheet lead after passing said tool.

39. In apparatus of the general nature of that herein described, in combination, a tool adapted to operate upon a lead sheet, means adapted to guide a strip of sheet lead to said tool, and means movable relative to said tool adapted to grip said strip and feed it past said tool in operative relation thereto.

40. In apparatus of the general nature of that herein described, in combination, a tool adapted to operate upon a lead sheet, means adapted to guide a strip of sheet lead to said tool, a device adapted to grip said strip, means adapted to move said device to feed said lead strip past said tool, and means adapted to release said grip upon a predetermined length of movement of said device.

41. In apparatus of the general nature of that herein described, in combination, a tool adapted to operate upon a lead sheet, means adapted to guide a strip of sheet lead to said tool, a device adapted to grip said strip, driving means adapted to move said device to draw said strip past said tool, and means adapted to release said device from said driving means upon a predetermined length of movement of said device.

42. In apparatus of the general nature of that herein described, in combination, a tool adapted to operate upon a lead sheet, means adapted to guide a strip of sheet lead to said tool, a device adapted to grip said strip, driving means adapted to move said device to draw said strip past said tool, and means adapted to release said grip and means adapted to release said device from said driving means upon a predetermined length of movement of said device.

43. In apparatus of the general nature of that herein described, in combination, a tool adapted to operate upon a lead sheet, means adapted to guide a strip of sheet lead to said tool, a device adapted to grip said strip, driving means adapted to move said device to draw said strip past said tool, means adapted to release said grip and means adapted to release said device from said driving means upon a predetermined length of movement of said device, and means adapted to return said device substantially to its initial position.

44. In apparatus of the general nature of that herein described, in combination, a tool adapted to operate upon a lead sheet, means adapted to guide a strip of sheet lead to said tool, means adapted to move said strip past said tool in operative relation thereto and yielding means adapted to oppose the movement of said strip.

45. In apparatus of the general nature of that herein described, in combination, a die member adapted to operate upon sheet metal and having a plurality of projections arranged side by side in a row transversely of the surface of the die and adapted to enter said sheet, said projections being shaped to displace the metal of said sheet in a direction longitudinally of the surface of said die, the portions of said die surface between said projections being rounded so as to form rounded ribs in said sheet between the portions thereof which said projections enter, and means for actuating said die.

46. In apparatus of the general nature of that herein described, in combination, a tool adapted to operate upon sheet metal having means adapted to form in said sheet substantially parallel spaced slots and means adapted to displace the metal of said sheet at the portions thereof where said slots are formed in a direction substantially longitudinally of said slots, and means for actuating said tool.

47. In apparatus of the general nature of that herein described, in combination, a tool adapted to operate upon sheet metal having means adapted to form therein a plurality of substantially parallel spaced bars and at the same time to displace the metal of said sheet in a direction substantially longitudinally of said bars, and means for actuating said tool.

48. In apparatus of the general nature of that herein described, in combination, a tool adapted to operate upon sheet metal having means adapted to form therein a plurality of substantially parallel spaced bars of rounded contour and at the same time to displace the metal of said sheet in a direction substantially longitudinally of said bars, and means for actuating said tool.

49. In apparatus of the general nature of that herein described, in combination, a pair of die members adapted to receive therebetween a sheet of metal and operate thereon, said die members having coacting parts adapted to remove the metal of said sheet at spaced parts to form therein substantially parallel slots, and coacting parts adapted to shape the portions of said sheet between said slots into substantially parallel rounded bars.

50. In apparatus of the general nature of that herein described, in combination, a pair of die members adapted to receive therebetween a metal sheet and operate thereon, said die members having coacting parts adapted to shape from said metal sheet a plurality of substantially parallel rounded bars, and coacting parts adapted to displace the surplus metal.

51. In apparatus of the general nature of that herein described, in combination, a pair of die members adapted to receive therebetween a metal sheet and operate thereon, said die members having coacting parts adapted to shape from said metal sheet a plurality of substantially parallel rounded bars, and coacting parts adapted to displace the surplus metal in a direction substantially lengthwise of said bars as the latter are formed.

52. In apparatus of the general nature of that herein described, in combination, a pair of die members adapted to receive therebetween a metal sheet and operate thereon, said die members having a plurality of coacting projections adapted to displace the metal of said sheet in a plurality of substantially parallel spaced paths, the coacting parts intermediate said projections being adapted to round the surfaces of the metal intermediate said parallel paths.

53. In apparatus of the general nature of that herein described, in combination, a pair of dies, means for feeding a lead sheet between said dies, and means for actuating said dies to operate upon said moving lead sheet, said dies having coacting parts adapted to form in said sheet a plurality of substantially parallel bars.

54. In apparatus of the general nature of that herein described, in combination, a pair of dies, means for feeding a lead sheet between said dies, and means for repeatedly actuating said dies to operate upon said moving lead sheet, said dies having coacting parts adapted to punch out portions of said sheet to form therein parallel slots.

55. In apparatus of the general nature of that herein described, in combination, a pair of dies, means for feeding a lead sheet between said dies, and means for repeatedly actuating said dies to operate upon said moving lead sheet, said dies having coacting parts adapted to displace the metal of said sheet to form therein parallel grooves and having coacting parts adapted to round the metal intermediate of said grooves.

56. In apparatus of the general nature of that herein described, in combination, a pair of dies, means for feeding a lead sheet between said dies, and means for repeatedly actuating said dies to operate upon said moving lead sheet, said dies having coacting parts adapted to displace the metal of said sheet in a direction substantially longitudinally of said feed.

57. In apparatus of the general nature of that herein described, in combination, a pair of dies, means for feeding a lead sheet between said dies, and means for repeatedly actuating said dies to operate upon said moving lead sheet, said dies having coacting parts adapted to displace the metal of said sheet in a direction substantially longitudinally of said feed to form in said sheet a plurality of substantially parallel bars.

58. In apparatus of the general nature of that herein described, in combination, a pair of dies, means for feeding a lead sheet between said dies, and means for repeatedly actuating said dies to operate upon said moving lead sheet, said dies having coacting parts adapted to displace the metal of said sheet to form therein parallel ribs, and having coacting parts adapted to pierce the metal between said ribs.

59. In apparatus of the general nature of that herein described, in combination, a pair of dies, means for feeding a lead sheet between said dies, and means for repeatedly actuating said dies to operate upon said moving lead sheet, said dies having coacting parts adapted to swage the metal of said sheet to form therein a plurality of parallel bars joined by thin webs of metal, and having means adapted to remove said webs.

60. In apparatus of the general nature of that herein described, in combination, a pair of die members adapted to operate upon sheet metal therebetween, resilient means urging said dies apart, a driven crank shaft, and a member upon said crank shaft adapted at each rotation thereof to strike one of said dies and force it toward the other thereof.

In testimony whereof, we have signed our names to this specification this 2nd day of August 1923.

THEODORE S. COLE.
SETH JOHNSON.